(12) United States Patent
Segal et al.

(10) Patent No.: US 8,914,759 B2
(45) Date of Patent: Dec. 16, 2014

(54) ABSTRACT CREATION

(71) Applicant: Synopsys, Inc., Mountain View, CA (US)

(72) Inventors: Russell Segal, Sunnyvale, CA (US); Peiqing Zou, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/849,425

(22) Filed: Mar. 22, 2013

(65) Prior Publication Data

US 2014/0189624 A1  Jul. 3, 2014

Related U.S. Application Data

(60) Provisional application No. 61/747,967, filed on Dec. 31, 2012.

(51) Int. Cl.
*G06F 17/50* (2006.01)

(52) U.S. Cl.
CPC .................................... *G06F 17/505* (2013.01)
USPC ........... 716/108; 716/102; 716/103; 716/104; 716/106; 716/111; 716/113; 716/132; 716/136

(58) Field of Classification Search
CPC . G06F 17/505; G06F 17/5031; G06F 221/84; G06F 17/5045
USPC ......... 716/102, 103, 104, 106, 108, 111, 113, 716/132, 136
See application file for complete search history.

(56) References Cited

U.S. PATENT DOCUMENTS

| 5,923,564 | A  | * | 7/1999  | Jones .......................... 716/103 |
| 6,539,536 | B1 | * | 3/2003  | Singh et al. ................... 716/102 |
| 6,651,223 | B2 |   | 11/2003 | Yamashita et al. |
| 6,671,859 | B1 | * | 12/2003 | Naylor et al. ................. 716/113 |
| 6,766,500 | B1 | * | 7/2004  | Donelly et al. ................ 716/104 |
| 6,954,915 | B2 | * | 10/2005 | Batchelor ...................... 716/113 |
| 7,055,121 | B1 | * | 5/2006  | Bolander et al. .............. 716/113 |
| 7,246,340 | B1 | * | 7/2007  | Van Antwerpen et al. ... 716/104 |
| 7,251,800 | B2 |   | 7/2007  | McElvain et al. |
| 7,290,240 | B1 | * | 10/2007 | Lam-Leventis et al. ....... 716/104 |
| 7,337,100 | B1 | * | 2/2008  | Hutton et al. ................... 703/13 |
| 7,434,187 | B2 | * | 10/2008 | Brahme et al. ................ 716/126 |
| 7,487,486 | B2 | * | 2/2009  | Celik et al. .................... 716/134 |
| 7,546,567 | B2 | * | 6/2009  | Cheon et al. ................... 716/113 |
| 7,698,672 | B1 | * | 4/2010  | Sutardja ........................ 716/106 |
| 7,716,618 | B2 | * | 5/2010  | Ferrari et al. ................. 716/119 |
| 7,840,918 | B1 | * | 11/2010 | Duthou ........................ 716/132 |

(Continued)

*Primary Examiner* — Helen Rossoshek
(74) *Attorney, Agent, or Firm* — Park, Vaughan, Fleming & Dowler LLP; Laxman Sahasrabuddhe

(57) ABSTRACT

Systems and techniques for creating a circuit abstraction are described. During operation, an embodiment can identify a set of side loads based on a set of timing paths. According to one definition, a side load of a timing path is a circuit element that is not on the timing path (i.e., the timing path does not pass through the circuit element), but whose input is electrically connected to an output of at least one circuit element that is on the timing path. Next, the embodiment can creating the circuit abstraction by retaining circuit elements and nets on each timing path in the set of timing paths, and retaining an identifier for each side load in the set of side loads. The circuit abstraction can then be used to update timing information during one or more stages of an electronic design automation flow.

12 Claims, 4 Drawing Sheets

(56) References Cited

U.S. PATENT DOCUMENTS

| | | | |
|---|---|---|---|
| 7,917,871 B2* | 3/2011 | Kobayashi et al. | 716/51 |
| 8,051,398 B2* | 11/2011 | Bittlestone et al. | 716/111 |
| 8,117,577 B1 | 2/2012 | Vadi et al. | |
| 8,281,267 B2* | 10/2012 | Komatsu | 716/108 |
| 8,281,269 B2* | 10/2012 | Shibatani et al. | 716/111 |
| 8,305,126 B2* | 11/2012 | Smith et al. | 327/202 |
| 8,307,315 B2* | 11/2012 | Adya et al. | 716/108 |
| 8,307,316 B2* | 11/2012 | Albrecht et al. | 716/113 |
| 8,332,793 B2* | 12/2012 | Bose | 716/114 |
| 8,365,116 B2 | 1/2013 | Stevens et al. | |
| 8,392,861 B2* | 3/2013 | Shibatani et al. | 716/114 |
| 8,405,413 B2* | 3/2013 | Carpenter et al. | 324/750.3 |
| 8,464,198 B1* | 6/2013 | Chakravarty | 716/132 |
| 8,510,693 B2 | 8/2013 | Sato et al. | |
| 8,555,235 B2* | 10/2013 | Oh et al. | 716/136 |
| 8,595,671 B2* | 11/2013 | He | 716/116 |
| 8,615,727 B2* | 12/2013 | Ghanta et al. | 716/134 |
| 8,635,583 B2* | 1/2014 | Gupta et al. | 716/139 |
| 8,640,066 B1* | 1/2014 | Gupta et al. | 716/108 |
| 2010/0005429 A1* | 1/2010 | Zejda et al. | 716/1 |
| 2013/0227510 A1* | 8/2013 | Katz et al. | 716/113 |

* cited by examiner

ABSTRACT CREATION

RELATED APPLICATION

This application claims priority to U.S. Provisional Application Ser. No. 61/747,967, by the same inventors, filed on 31 Dec. 2012, having the contents of which are herein incorporated by reference in their entirety.

BACKGROUND

1. Technical Field

This disclosure relates to electronic design automation (EDA). More specifically, this disclosure relates to creating and using a circuit abstraction.

2. Related Art

Advances in process technology and an almost unlimited appetite for consumer electronics have fueled a rapid increase in the size and complexity of integrated circuit (IC) designs. The performance of EDA tools is very important because it reduces the time to market for IC designs. Floorplanning and circuit optimization, which are important stages in an EDA design flow, involve creating a circuit design that meets a set of timing constraints, and at the same time optimizes one or more metrics, such as area, leakage power, etc.

Unfortunately, due to the rapid increase in the size and complexity of IC designs, and the stringent timing, area, and power budgets that are imposed on the IC designs, conventional floorplanning and circuit optimization tools often take a very long time to complete and/or produce poor quality results.

SUMMARY

Some embodiments described herein provide methods and systems for creating a circuit abstraction that can significantly improve performance of floorplanning and circuit optimization. Specifically, the circuit abstraction described in this disclosure can be used for determining and/or updating timing information in the circuit design during floorplanning and/or circuit optimization. The size of the circuit abstraction described in this disclosure can be substantially smaller than the size of the circuit design.

During operation, a set of timing paths can be determined in the circuit design. Next, a set of side loads can be identified based on the set of timing paths. According to one definition, a side load of a timing path is a circuit element that is not on the timing path (i.e., the timing path does not pass through the circuit element), but whose input is electrically connected to an output of at least one circuit element that is on the timing path. The circuit abstraction can then be created by retaining circuit elements and nets on each timing path in the set of timing paths, and retaining an identifier for each side load in the set of side loads. Once created, the circuit abstraction can be used to determine and/or update timing information during one or more stages of an electronic design automation flow.

DETAILED DESCRIPTION

Figure 1A:
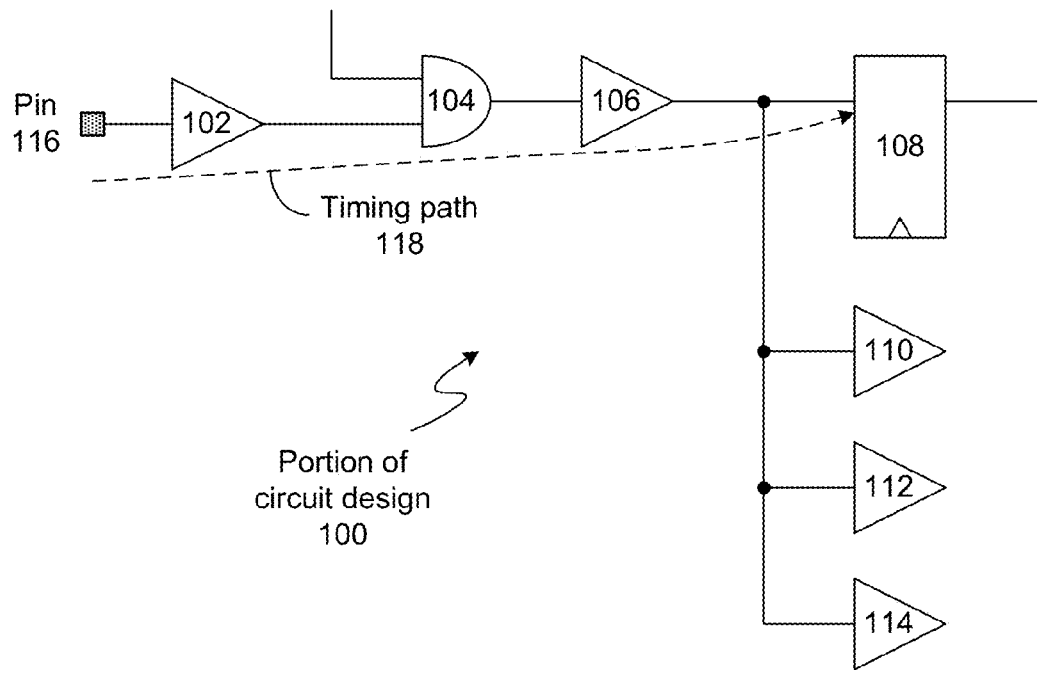
FIGS. 1A-1B illustrate how a circuit abstraction can be created in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., Verilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Circuit Abstraction

A circuit abstraction is a representation of a circuit design that does not include all of the details of the circuit design. A circuit abstraction can be used to improve the performance of one or more stages in an EDA flow. Some embodiments described herein create a circuit abstraction that can substantially improve the performance of floorplanning and circuit optimization.

One operation that is performed during floorplanning involves placing circuit blocks in the circuit design in a manner that satisfies timing constraints. For example, suppose a signal is launched from a register in a first circuit block and is captured by a register in a second circuit block. The delay between the launch and the capture will depend on, among other things, the locations where the first and second circuit blocks are placed in the circuit design. In particular, the greater the distance between the two circuit blocks, the greater the delay between the launch and the capture of the signal. The maximum amount of delay that can be tolerated between the launch and capture of the signal can dictate how far these two circuit blocks can be placed from each other in the circuit design. Therefore, if a circuit abstraction is to be used for floorplanning, then the circuit abstraction must retain sufficient details of the circuit design to enable a floorplanning tool to calculate delays of timing paths that originate at a register in one circuit block and end in another register in another circuit block.

The circuit abstraction described herein can also be used during circuit optimization. Circuit optimization approaches typically create an initial circuit design. Next, a circuit element, e.g., a cell, is identified in the circuit design for optimization based on the metrics (e.g., timing, area, leakage power, etc.) that are desired to be optimized. An optimal size for the identified cell is then determined by iteratively replacing the identified cell with functionally equivalent cells that have different sizes (this optimization process is also referred to as "sizing the cell"). For each replacement cell size that is tried, the circuit optimization approach updates timing information through at least a portion of the circuit design, and rejects cell sizes for which one or more timing requirements are violated (updating timing information in the circuit design and checking timing requirement violations can take up a significant portion of the circuit optimization runtime). The iterative optimization process typically terminates after the circuit design is sufficiently optimized or after the optimization process has executed for a certain number of iterations or for a certain amount of time.

Updating timing information typically involves propagating arrival times, required times, and transition times through at least a portion of the circuit design. The arrival time associated with a terminal of a gate indicates when a signal is expected to arrive at the terminal. The required time associated with the terminal indicates when the signal is required to arrive at the terminal. The slack associated with a terminal is the difference between the required time and the arrival time (typically, the slack of a terminal is said to be violating if it is less than a predetermined threshold value, e.g., zero). The transition time associated with the terminal indicates the rate at which the signal is expected to change state.

A circuit design typically needs to satisfy multiple types of timing requirements (also referred to as timing constraints). A setup time requirement is violated if a signal reaches a pin later than it is supposed to reach, e.g., a setup time violation may occur when a signal reaches a register input after the clock transition. A hold time requirement is violated if a signal does not remain stable for a sufficient amount of time, e.g., a signal at a register's input may change before the register can capture the signal's value. A transition time requirement is violated if the signal takes too long to transition between two states.

If a circuit abstraction is to be used during circuit optimization, the circuit abstraction must retain sufficient details of the circuit design to enable the circuit optimization process to accurately update timing information so that timing requirement violations can be checked.

Figure 1B:
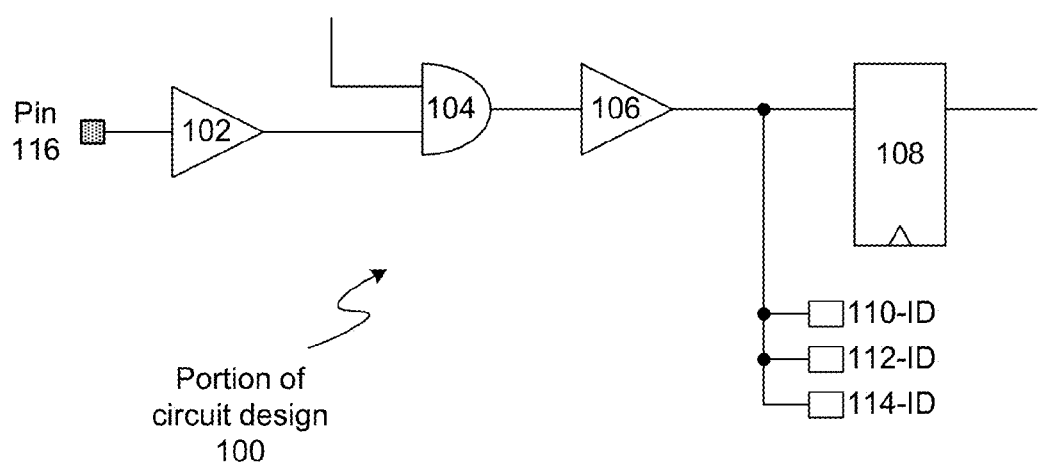

FIGS. 1A-1B illustrate how a circuit abstraction can be created in accordance with some embodiments described herein. As shown in FIG. 1A, portion of circuit design 100 includes a plurality of circuit elements, such as gates 102, 104, 106, 110, 112, and 114, and sequential circuit element 108. Pin 116 can correspond to a pin of a circuit block that includes portion of circuit design 100.

During floorplanning, an EDA tool may need to determine the delay of timing path 118 which begins at pin 116 and ends at an input of sequential circuit element 108. One of the components in the delay of timing path 118 is the delay of gate 106, and one of the parameters that is required for determining the delay of gate 106 is the output load of gate 106. For example, a non-linear delay table (NLDM) for gate 106 can be used to determine delay of gate 106. An NLDM is typically a four dimensional table, wherein a table lookup on the NLDM is performed using the input transition value and the output load value for the gate, and the result of the table lookup provides the output transition value and the output delay value for the gate.

Note that, to compute the output load value for gate 106, we need to consider the input capacitances of the side loads, i.e., gates 110-114. According to one definition, a side load of a timing path is a circuit element that is not on the timing path (i.e., the timing path does not pass through the circuit element) but whose input is electrically connected to an output of at least one circuit element that is on the timing path. Gate 110 is a side load of timing path 118 because timing path 118 does not pass through gate 110, but an input of gate 110 is electrically connected to an output of a gate (i.e., gate 106) that is on timing path 118. Some circuit abstraction techniques include all of the details of the side loads, e.g., gates 110-114.

Some embodiments described herein substantially reduce the size of the circuit abstraction by storing only an identifier for each side load instead of storing all of the details of each side load. For example, as shown in FIG. 1B, side load gates 110-114 have been replaced by identifiers 110-ID, 112-ID, and 114-ID. Storing the entire description of a side load can require hundreds of bytes, whereas storing an identifier for the side load can require only a few bytes. Furthermore, note that each timing path can have tens or hundreds of side loads. Therefore, embodiments described in this disclosure can significantly reduce the size of the circuit abstraction. When timing information needs to be updated (e.g., during floorplanning or circuit optimization), the side load identifier (e.g., 110-ID) can be used to determine the input capacitance of the side load. For example, the side load identifier (and additionally a process corner identifier) can be used to perform a lookup on a data structure (which can be created based on a cell library) that stores side load input capacitances for different process corners. Note that the net that electrically connects the output of gate 106 with the inputs of side load gates 110-114 and the input of sequential circuit element 108 is also retained in the circuit abstraction.

Figure 2:
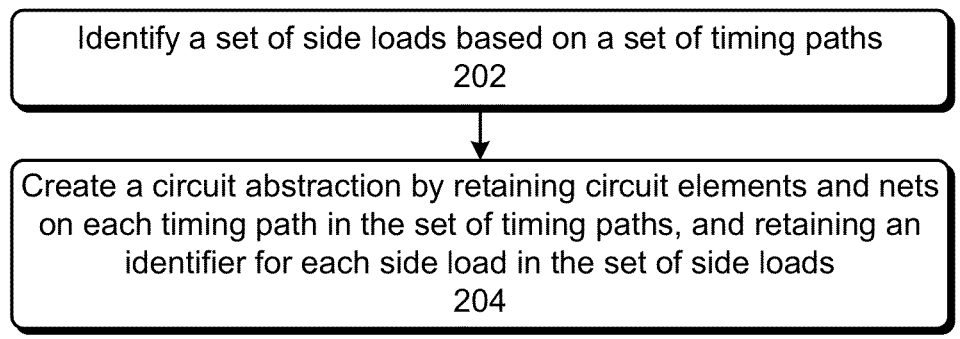
FIG. 2 presents a flowchart that illustrates a process for creating a circuit abstraction in accordance with some embodiments described herein.

FIG. 2 presents a flowchart that illustrates a process for creating a circuit abstraction in accordance with some embodiments described herein. The process can begin by identifying a set of side loads based on a set of timing paths (operation 202). Next, the process can create the circuit abstraction by retaining circuit elements and nets on each timing path in the set of timing paths, and retaining an identifier for each side load in the set of side loads (operation 204). Note that circuit elements, nets, and any other information that is not retained in operation 204 can be removed, thereby substantially reducing the size of the circuit abstraction.

The set of timing paths that are used to create the circuit abstraction can depend on the application for which the circuit abstraction is being used. For example, if the circuit abstraction is being used to place circuit blocks in the floorplan, then the set of timing paths can be determined by identifying critical timing paths between a pin of a circuit block and an input or an output of a sequential circuit element in the circuit block. The circuit abstraction can then be used to check timing violations for a given placement of the circuit blocks in the floorplan.

Figure 3:
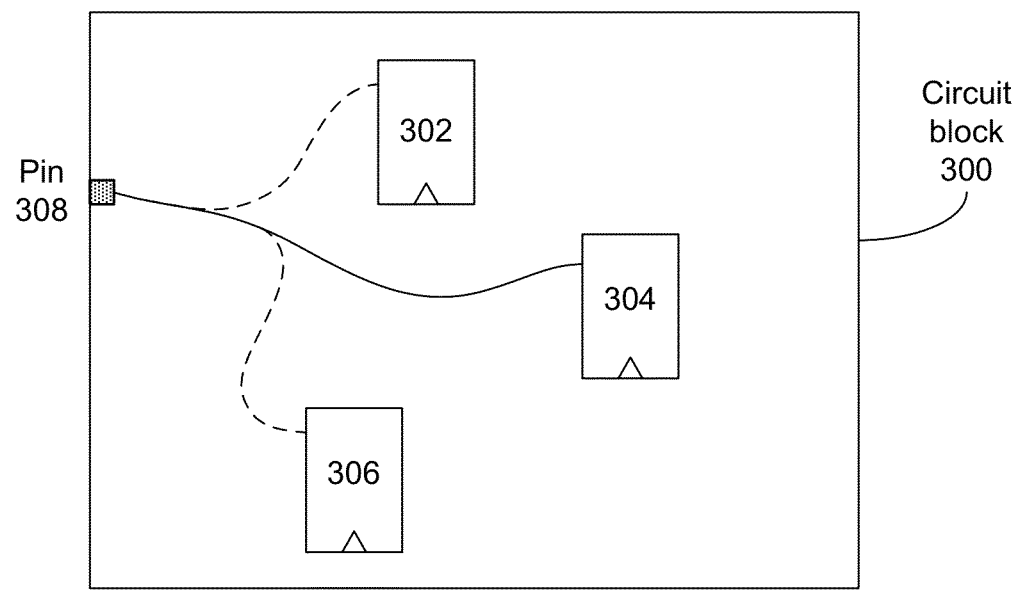
FIG. 3 illustrates a set of timing paths that can be used to create a circuit abstraction in accordance with some embodiments described herein.

FIG. 3 illustrates a set of timing paths that can be used to create a circuit abstraction in accordance with some embodiments described herein. Circuit block 300 includes pin 308 and sequential circuit elements 302-306. Three timing paths are shown in FIG. 3: a timing path between pin 308 and an input of sequential circuit element 302, a timing path between pin 308 and an input of sequential circuit element 304, and a timing path between pin 308 and an input of sequential circuit element 306. Of these three timing paths, only one may be critical (shown in FIG. 3 using a solid line). According to one definition, a timing path is a critical timing path if the timing path either violates one or more timing requirements (e.g., the timing path has a negative slack) or is substantially close to violating one or more timing requirements (e.g., the timing path has a very small positive slack). In some embodiments, only the critical timing paths between a pin of the circuit block and an input or output of a sequential circuit element (e.g., the timing path between pin 308 and the input of sequential circuit element 304) are used to create the circuit abstraction.

The circuit abstraction described herein can also be used during circuit optimization. Specifically, the process can receive a set of circuit elements in the circuit design that are candidates for optimization. Next, the process can determine the set of timing paths by identifying critical timing paths in the circuit design whose delay is affected by a change in an input capacitance of a circuit element in the set of circuit elements.

Figure 4A:
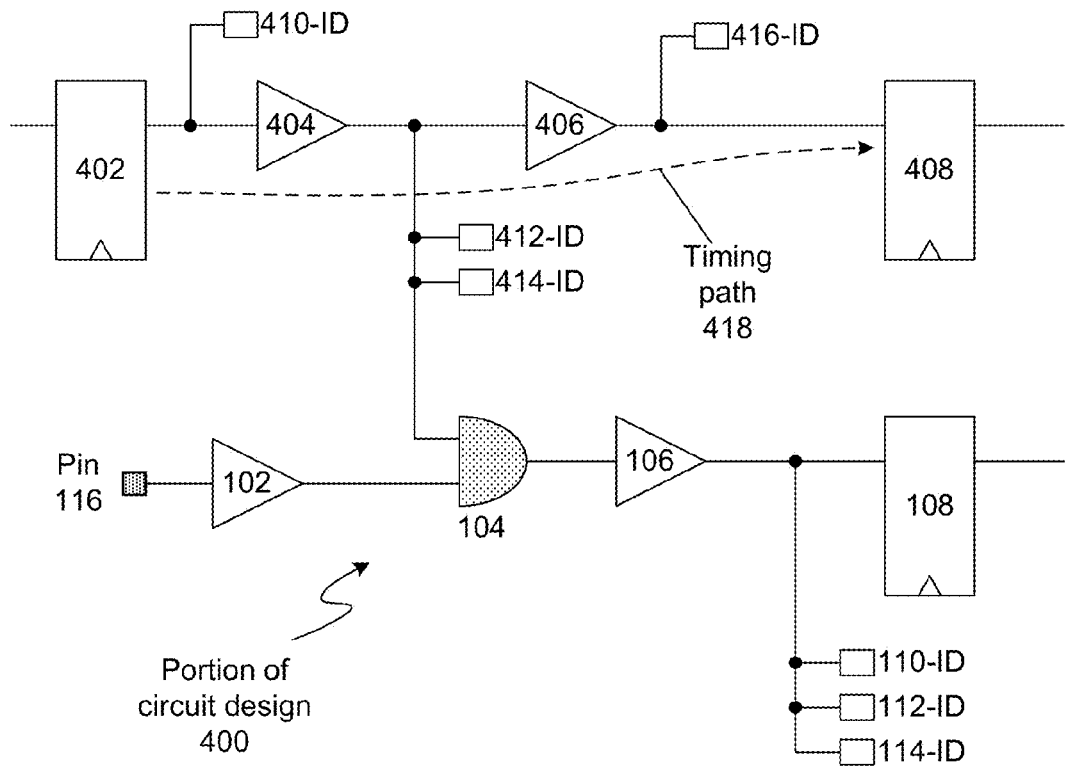
FIG. 4A illustrates a circuit abstraction that can be used during circuit optimization in accordance with some embodiments described herein.

FIG. 4A illustrates a circuit abstraction that can be used during optimization in accordance with some embodiments described herein. Portion of circuit design 400 includes the portion of circuit design 100 that was shown in FIGS. 1A-1B. Let us assume that gate 104 is a candidate for optimization. Note that the top input of gate 104 is electrically connected to the output of gate 404. When gate 104 is sized, it can change the input capacitance of the top input of gate 104, thereby changing the output load on gate 404. When the output load on gate 404 changes, it can change the delay of timing path 418 that begins at sequential circuit element 402, passes through gates 404 and 406, and ends at sequential circuit element 408. If timing path 418 is critical, then the abstract creation process can include timing path 418 in the set of timing paths that are used for creating the circuit abstraction.

Figure 4B:
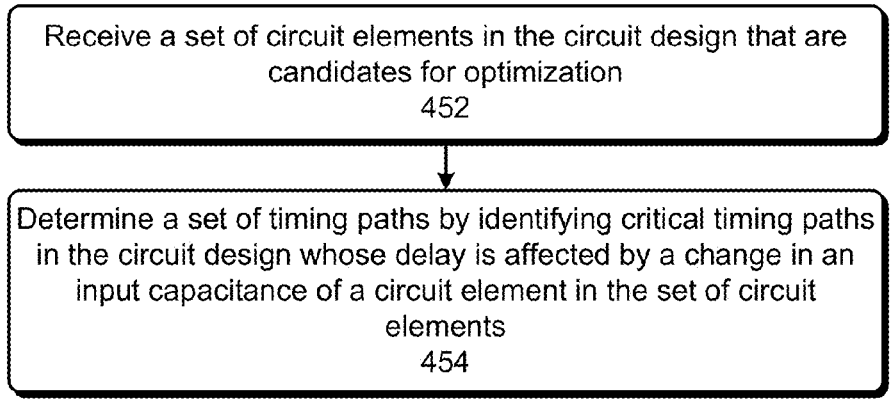
FIG. 4B presents a flowchart that illustrates a process for identifying a set of timing paths in accordance with some embodiments described herein.

FIG. 4B presents a flowchart that illustrates a process for identifying a set of timing paths in accordance with some embodiments described herein. The process can begin with receiving a set of circuit elements in the circuit design that are candidates for optimization (operation 452). Next, the process can determine the set of timing paths by identifying critical timing paths in the circuit design whose delay is affected by a change in an input capacitance of a circuit element in the set of circuit elements (operation 454).

Once the set of critical timing paths whose delays can be affected during circuit optimization are identified, the process can create a circuit abstraction based on the set of critical timing paths. Specifically, the circuit elements that are in each of the critical timing paths can be retained in the circuit abstraction. For example, as shown in FIG. 4, sequential circuit elements 402 and 408, gates 404 and 406, and the nets that are on timing path 418 can be retained.

Next, in some embodiments, the process can identify the side loads and retain the side loads in the circuit abstraction. For example, the actual side loads corresponding to side load identifiers 410-ID, 412-ID, 414-ID, and 416-ID can be retained in the circuit abstraction. Alternatively, in some embodiments, the process can retain only an identifier for each side load of each timing path in the set of critical timing path. For example, as shown in FIG. 4, only an identifier (e.g., identifiers 410-ID, 412-ID, 414-ID, and 416-ID) is retained for each of the side loads on timing path 418.

Computer System

Figure 5:
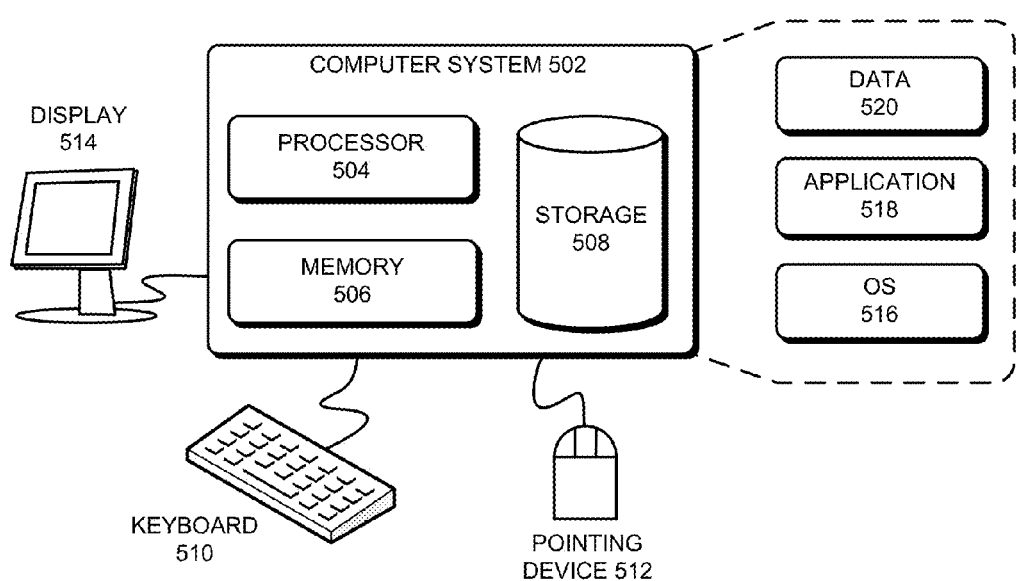
FIG. 5 illustrates a computer system in accordance with some embodiments described in this disclosure.

FIG. 5 illustrates a computer system in accordance with some embodiments described in this disclosure. Computer system 502 can include processor 504, memory 506, and storage device 508. Computer system 502 can be coupled to display device 514, keyboard 510, and pointing device 512. Storage device 508 can store operating system 516, application 518, and data 520. Data 520 can include input required by application 518 and/or output generated by application 518.

Computer system 502 may automatically (or with user intervention) perform one or more operations that are implicitly or explicitly described in this disclosure. For example, computer system 502 can load application 518 into memory 506, and application 518 can then be used to create a circuit abstraction that can be used to determine and/or update timing information during one or more stages in an EDA flow.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for creating a circuit abstraction, the method comprising:
   identifying a set of side loads based on a set of timing paths in a representation of a portion of the circuit design, wherein the representation includes connectivity information between circuit elements; and
   creating, by computer, the circuit abstraction for the portion of the circuit design by:
      retaining, in the circuit abstraction, circuit elements and nets on each timing path in the set of timing paths, and
      retaining, in the circuit abstraction, an identifier for each side load in the set of side loads.

2. The method of claim 1, further comprising determining the set of timing paths by identifying critical timing paths between a pin of a circuit block and an input or an output of a sequential circuit element in the circuit block.

3. The method of claim 1, further comprising:
   receiving a set of circuit elements that are candidates for optimization; and
   determining the set of timing paths by identifying critical timing paths whose delay is affected by a change in an input capacitance of a circuit element in the set of circuit elements.

4. The method of claim 1, wherein a side load of a timing path is a circuit element that is not on the timing path, but whose input is electrically connected to an output of at least one circuit element that is on the timing path.

5. A non-transitory computer-readable storage medium storing instructions that, when executed by a computer, cause the computer to perform a method for creating a circuit abstraction, the method comprising:
   identifying a set of side loads based on a set of timing paths in a representation of a portion of the circuit design, wherein the representation includes connectivity information between circuit elements; and
   creating the circuit abstraction for the portion of the circuit design by:
      retaining, in the circuit abstraction, circuit elements and nets on each timing path in the set of timing paths, and
      retaining, in the circuit abstraction, an identifier for each side load in the set of side loads.

6. The non-transitory computer-readable storage medium of claim 5, wherein the method further comprises determining the set of timing paths by identifying critical timing paths between a pin of a circuit block and an input or an output of a sequential circuit element in the circuit block.

7. The non-transitory computer-readable storage medium of claim 5, wherein the method further comprises:
   receiving a set of circuit elements that are candidates for optimization; and
   determining the set of timing paths by identifying critical timing paths whose delay is affected by a change in an input capacitance of a circuit element in the set of circuit elements.

8. The non-transitory computer-readable storage medium of claim 5, wherein a side load of a timing path is a circuit element that is not on the timing path, but whose input is electrically connected to an output of at least one circuit element that is on the timing path.

9. An apparatus, comprising:
   a processor; and
   a non-transitory computer-readable storage medium storing instructions that, when executed by the processor, cause the apparatus to perform a method for creating a circuit abstraction, the method comprising:
      identifying a set of side loads based on a set of timing paths in a representation of a portion of the circuit design, wherein the representation includes connectivity information between circuit elements; and
      creating the circuit abstraction for the portion of the circuit design by:
         retaining, in the circuit abstraction, circuit elements and nets on each timing path in the set of timing paths, and
         retaining, in the circuit abstraction, an identifier for each side load in the set of side loads.

10. The apparatus of claim 9, wherein the method further comprises determining the set of timing paths by identifying critical timing paths between a pin of a circuit block and an input or an output of a sequential circuit element in the circuit block.

11. The apparatus of claim 9, wherein the method further comprises:
    receiving a set of circuit elements that are candidates for optimization; and
    determining the set of timing paths by identifying critical timing paths whose delay is affected by a change in an input capacitance of a circuit element in the set of circuit elements.

12. The apparatus of claim 9, wherein a side load of a timing path is a circuit element that is not on the timing path, but whose input is electrically connected to an output of at least one circuit element that is on the timing path.

* * * * *